May 24, 1960
R. M. MAGNUSON
2,937,737
METHOD AND APPARATUS FOR DETERMINING THE
ORIENTATION OF PITS IN DRUPACEOUS FRUIT
Filed Nov. 6, 1957
3 Sheets-Sheet 1
FIG_1
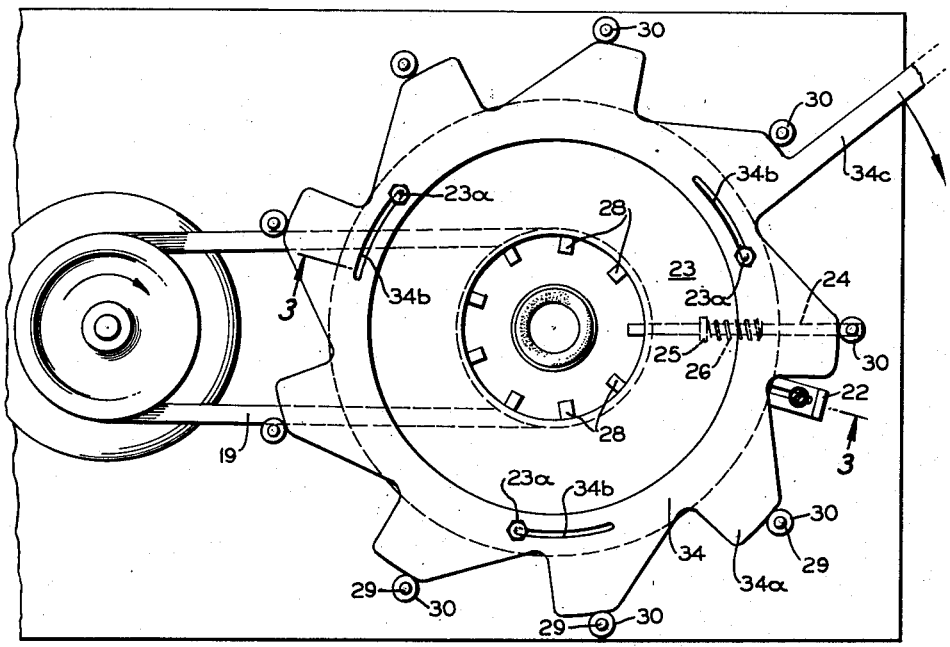
FIG_2
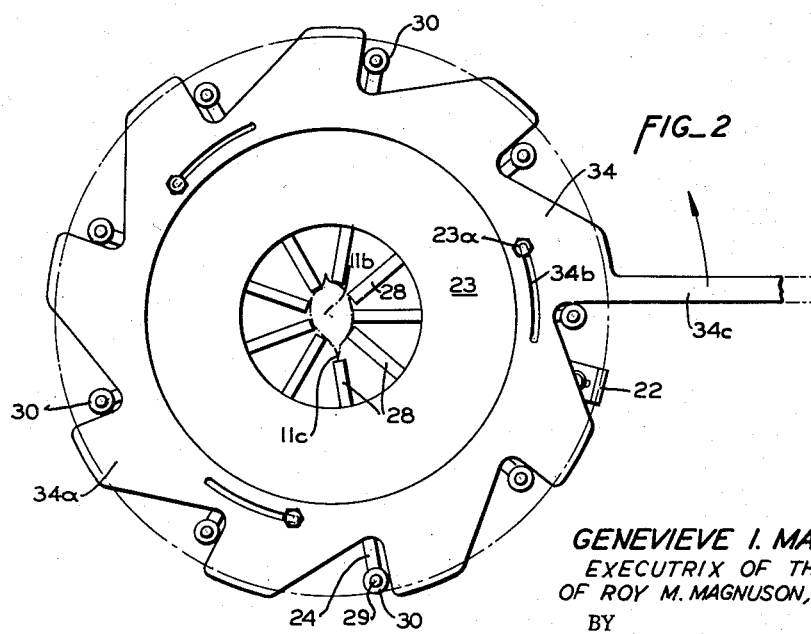
GENEVIEVE I. MAGNUSON
EXECUTRIX OF THE ESTATE
OF ROY M. MAGNUSON, DECEASED
BY
ATTORNEYS May 24, 1960   R. M. MAGNUSON   2,937,737
METHOD AND APPARATUS FOR DETERMINING THE
ORIENTATION OF PITS IN DRUPACEOUS FRUIT
Filed Nov. 6, 1957   3 Sheets-Sheet 2
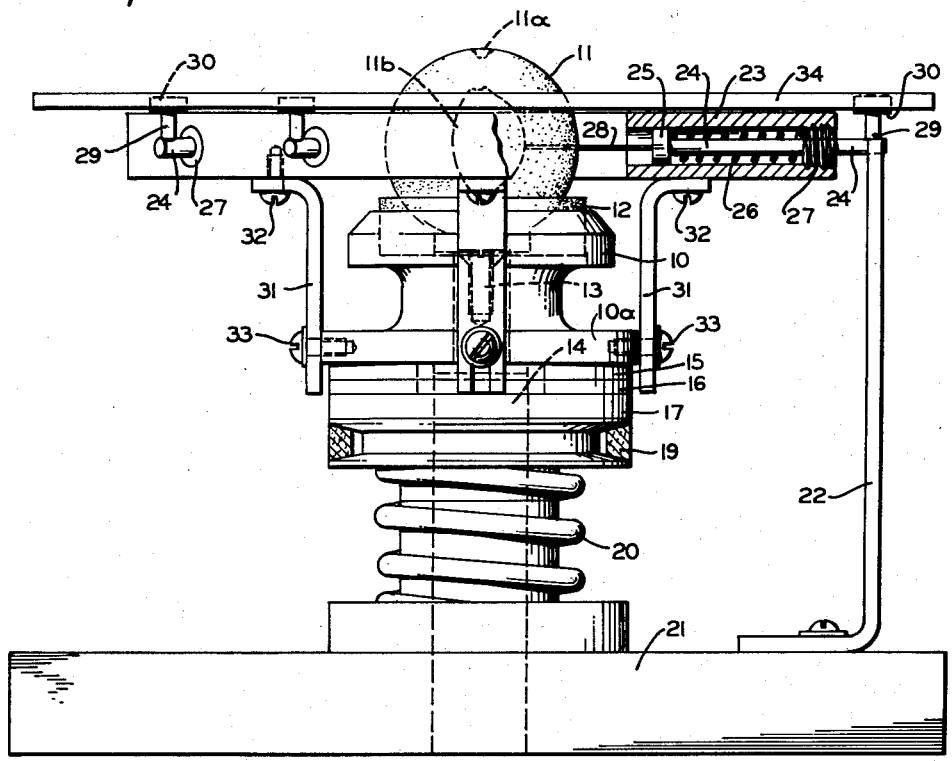
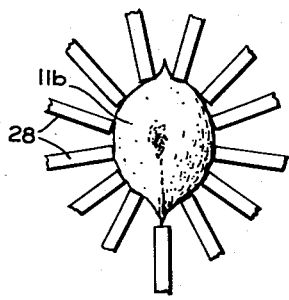
GENEVIEVE I. MAGNUSON
EXECUTRIX OF THE ESTATE
OF ROY M. MAGNUSON, DECEASED
BY
ATTORNEYS

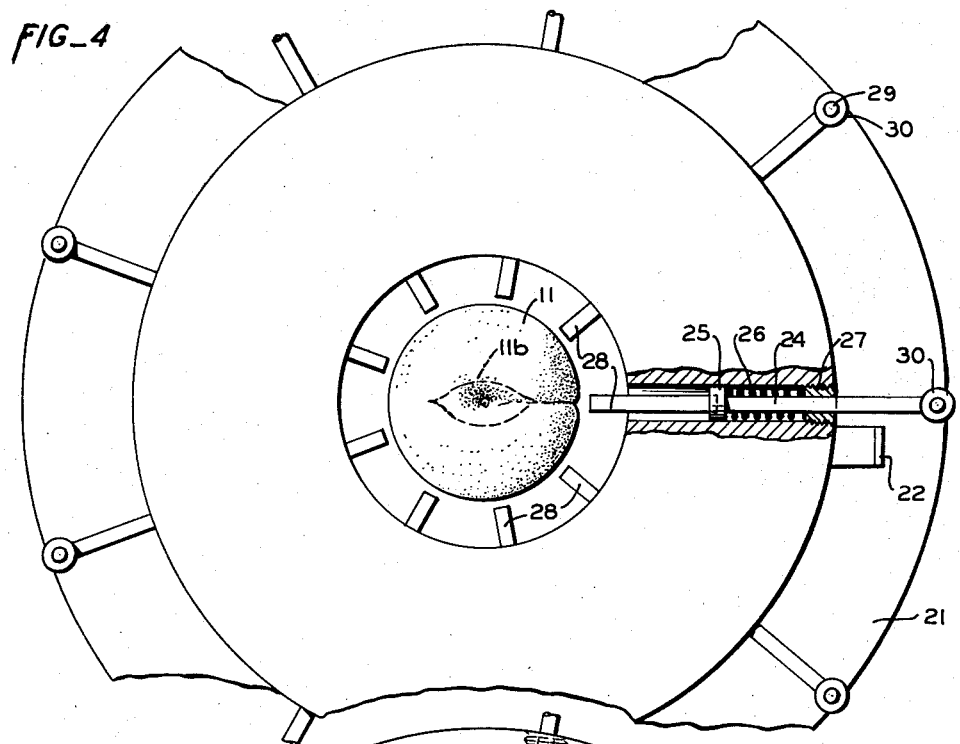
FIG_4
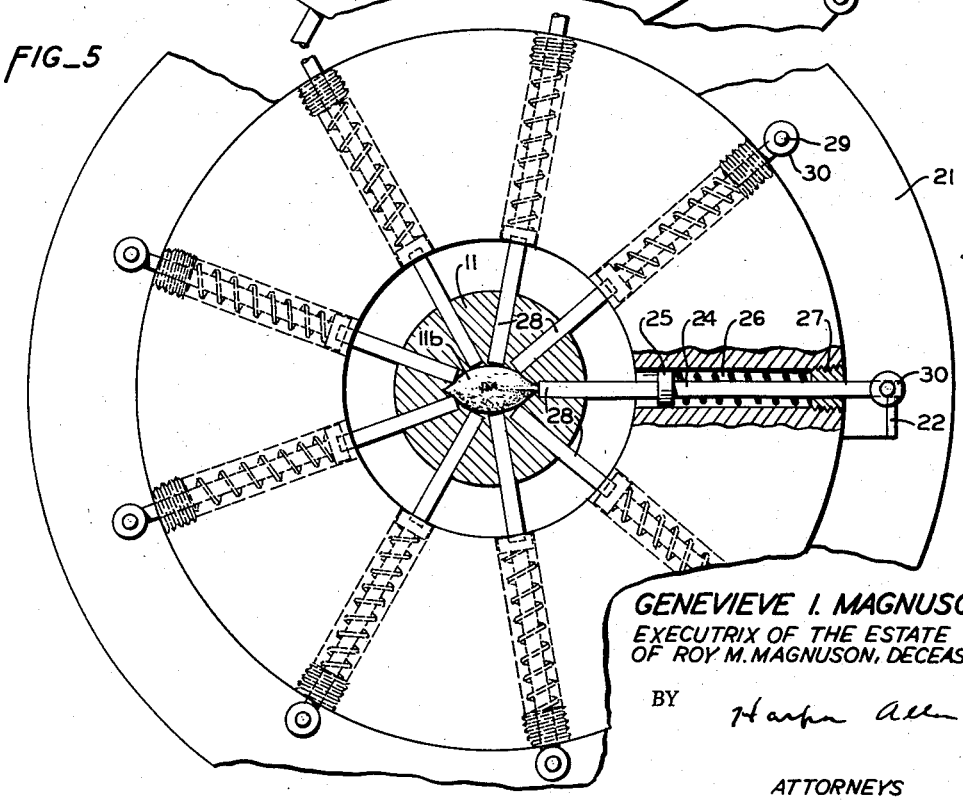
FIG_5

2,937,737

METHOD AND APPARATUS FOR DETERMINING THE ORIENTATION OF PITS IN DRUPACEOUS FRUIT

Roy M. Magnuson, deceased, late of Saratoga, Calif., by Genevieve I. Magnuson, executrix, Saratoga, Calif., assignor of one-half to herself and one-half to Genevieve I. Magnuson, Robert Magnuson, and Lois J. Fox, as trustees Filed Nov. 6, 1957, Ser. No. 694,852

10 Claims. (Cl. 198—33)

This invention relates to a method and apparatus for determining the position of the suture plane in drupaceous fruit.

An object if this invention is to provide an improved method and apparatus for determining certain orientation of pits inside of fruit, such as, peaches and the like, and from this locating the suture plane of the fruit.

A further object of this invention is to provide an improved device for determining the position of the suture line of the stone inside of drupaceous fruit.

Another object of this invention is to provide an improved method for feeling the contour of the pit inside of fruit to determine the plane along which the fruit is to be severed in half.

Still another object of this invention is to provide an improved method of determining the orientation of pits or stones in fruit by inserting an odd number of feelers into the fruit along a certain plant and gauging the exposed ends of said feelers to obtain an indication of the rough outline of the stone in the fruit along said plane.

A further object of this invention is to provide an improved method of determining the orientation of the stone in drupaceous fruit which includes the step of inserting a plurality of thin, flat feelers into the fruit in a plane that is substantially at right angles to the stem to blossom axis of the fruit, until the feelers engage the hard surface of the endocarp or stone.

A further object of this invention is to provide an improved method of locating the suture plane of the relatively hard endocarp or stone inside of drupaceous fruits by first orienting the fruit so that the axis passing through both the stem end and the blossom end is substantially vertical, thereafter inserting a plurality of feeler members into the fruit until said feelers engage the outer surface of the stone and thereafter gauging the exposed parts of the feelers to determine the rough outline of the stone.

Still another object of this invention is to provide an improved feeler arrangement comprising an odd number of thin, flat feelers arranged in a circle so that when these feelers are inserted into the fruit along a medial plane only one of the fellers will engage the suture plane of the stone.

Other and further objects of this invention will be apparent to those skilled in the art to which it relates from the following specification, claims and drawings.

In accordance with this invention there is provided an improved method and apparatus for determining the position of the suture plane of drupaceous fruit. In the method of this invention the fruit is first oriented manually or otherwise so that the stem to blossom axis of the fruit is lying in a particular direction, for example, in a vertical direction. With this orientation of the fruit it is placed upon a suitable rotatable pedestal that supports a plurality of feeler members which are adapted to be pressed into the fruit along a given plane so that their inner ends engage the hard outer surface of the stone sometimes referred to as the endocarp. With the fruit thus impaled on the feeler members the fruit and feeler mechanism is rotated past a stationary gauging member so that the feeler member projecting from the fruit the greatest distance may be determined. This feeler member corresponds to the member engaging the suture line of the stone and accordingly the position of the suture line with reference to the external surface of the fruit is located by this member and the fruit may then be passed on to the apparatus employed for halving the fruit along a plane including the suture line of the stone.

The ends of the feeler members inserted into the fruit are preferably in the shape of thin narrow blades all of which lie in substantially the same plane so that the relatively wide front edges of these thin blades approach the stone in the fruit substantially at right angles to the suture line of said stone. This is an important feature of this invention inasmuch as it has been found that the major markings in the outer surfaces of the stones extend generally in the direction of the suture line, that is, these markings do not as a rule extend across the suture line. With feelers of this shape a pronounced indication of the suture line of the stone is obtained. These and other features of this invention will be apparent to those skilled in the art to which it relates from the following specification, claims and drawings in which briefly:

Figure 1 is a plan view of an apparatus that may be used to perform certain steps of this method;

Figure 2 is a plan view of a portion of the apparatus shown in Figure 2 illustrating the rotatable feeler member withdrawing plate in position to permit entry of the feeler members into the fruit to engage the pit.

Figure 3 is a side view of the apparatus shown in Figure 1 partially in section;

Figure 4 is a detailed view showing the fruit positioned in the feeler apparatus;

Figure 5 is a view similar to Figure 4 showing the feeler members inserted into the fruit and engaging the stone thereof; and Figure 6 is a view showing the use of a larger number of feeler members.

Referring to the drawings there is illustrated an apparatus of this invention that may be employed for performing certain steps of the method of this invention. This apparatus employs a rotatable pedestal 10 upon which the drupaceous fruit 11 is adapted to be supported. The fruit 11 is first oriented manually or otherwise with the stem to blossom axis 11a thereof in a substantially vertical direction and in this position the fruit is placed upon the collar 12 which is of resilient material such as rubber or the like and is lodged in a suitable recess formed in the top of the rotatable pedestal 10. This pedestal is attached to the upper end of the shaft 14 by means of the machine screw 13 and is supported on a shoulder formed on the shaft 14. A flange 10a is provided to the lower end of the pedestal 10 and is formed integral therewith. This flange 10a is provided with a friction disc 15 that is attached to the bottom thereof by a suitable cement and this friction disc 15 cooperates with another friction disc 16 that is attached to the top of the pulley 17. A spring 20 is positioned below the pulley 17 and above the base member 21 for the purpose of urging the friction disc 16 that is attached to the pulley 17 into frictional engagement with the disc 15.

A feeler member retaining plate 23 is supported by means of a plurality of upright members 31 from the flange 10a of the pedestal. The bottom portions of these upright members 31 are attached to the flange 10a by suitable machine screws 33 and the top portions thereof are attached to the feeler retaining plate 23 by means of suitable machine screws 32. The feeler retaining plate 23 is provided with a plurality of radially extending holes for receiving the feeler members 24 as shown in Figures 4 and 5 and each of these feeler members is provided with a body portion that is surrounded by a suitable coil spring 26. One end of each of these springs 26 abuts the flange 25 provided to each of the feeler members. The other end of the springs 26 abut suitable threaded collar members 27 that are threaded into the outer end portions of the radial holes. The flanges 25 of the feeler members are each provided with a slot in which the flat elongated feelers 28 are fastened by soldering, welding or the like.

The thin flat elongated portions 28 of the feelers are drawn into the retaining plate 23 against the tension of the springs 26 by means of a rotatable plate 34 to permit the operator to place fruit upon the pedestal between the inner ends of these feeler portions. For this purpose the outer ends of the body portions of the feeler members are provided with upright members 29 which support the rollers 30 that are adapted to engage the peripheral surface of the rotatable plate 34. The plate 34 which is attached to the plate 23 by means of the bolts 23a that engage the plate 34 in the slots 34b, is provided with tooth-like sections 34a that extend radially therefrom. One of the sides of each of these tooth-like sections 34a is provided with a gradually sloping surface adapted to be engaged by a corresponding roller 30 so that as the plate 34 is rotated by means of the lever 34c through an angle determined by the length of the slots 34b, the rollers 30 engage the gradually inclined surface of the tooth-like members 34a and the feelers are drawn into the aforesaid radial holes formed in the plate 23, thus leaving the central opening in the member 23 substantially clear of the feelers and open for receiving the fruit.

When the fruit 11 is placed on the resilient ring 12 of the pedestal 10 as shown in Figure 3 the lever 34c is rotated clockwise from the position shown in Fig. 1 to the position shown in Figure 2 and the thin, flat feelers 28 are pressed into the fruit 11 by means of the springs 26 whereupon the relatively wide working ends of the thin feelers 28 engage the surface of the stone of the fruit.

It will be observed that an odd number of feelers 28 is employed as illustrated in the various views and the purpose of this is to provide an unsymmetrical feeler arrangement so that no two feelers will engage the stone of the fruit from diametrically opposite directions. Thus no two feelers will engage the suture line of the stone from diametrically opposite directions. Of course, this result may be obtained by using an even number of unequally spaced feelers so that they do not approach the stone from diametrically opposite directions. Furthermore a larger number of feelers may be used as illustrated in Figure 6.

With the member 34 in the position shown in Figure 2 and with the working ends of the feelers 28 in engagement with the outer surface of the stone different lengths of the bodies 24 of the feeler members will be exposed beyond the peripheral surface of the feeler member supporting plate 23 as shown in this figure. The feeler 28 in engagement with the suture line 11c of the stone 11b extends outward beyond the supporting plate 23 the furthest. As a result when the pedestal structure supporting the fruit and the feeler member structure, is rotated on the shaft 14 the projecting end of the feeler member that engages the suture line 11c comes in contact with the stop member 22 that is attached to the base 21 as shown in Figure 3. Rotation of the pedestal structure is therefore arrested by the stop member 22 and as the result the suture line of the stone is lined up with the stop member 22, when rotation of the pedestal structure is arrested by this stop member. The suture plane of the fruit contains or passes through the suture line of the stone and after the suture line of the stone is located the lever 34c is rotated in the counter-clockwise direction with respect to the fruit and feeler member as shown in Fig. 2 so that the rollers 30 are engaged by the inclined sides of the tooth-like sections 34a and the feelers associated with these rollers are withdrawn from the fruit.

The rollers 30 are then in engagement with the arcuate outer surfaces of the tooth-like sections 34a and in this position retain the feeler members in withdrawn positions against the tension of the springs 26.

After the suture line of the stone is oriented as above described, the fruit is ready to be delivered to the fruit halving station where it is cut in half along the suture plane of the fruit which includes the suture line of the stone. This may of course be done manually if desired.

While there has been shown a preferred embodiment of the invention it will be understood that the invention is capable of variation and modification from the form shown so that its scope should be limited only by the scope of the claims appended hereto.

What is claimed is:

1. A method of determining the position of the suture plane of drupaceous fruit comprising the steps of penetrating the fruit along a medial plane with reference to the stem to blossom axis at a plurality of points, gauging the thickness of fibrous epicarp and fleshy mesocarp and thereby locating the suture line of the hard endocarp which lies in the suture plane of the fleshy part of the fruit.

2. A method of determining the position of the suture plane of drupaceous fruit comprising the steps of orienting and supporting the drupaceous fruit so that the stem to blossom axis is in a predetermined direction, inserting a plurality of feelers into the fruit along a plane that is substantially at right angles to said axis until the feelers contact the endocarp, determining the location of the suture line of the endocarp from the distance that the feelers extend into the fruit, which line lies in the suture plane of the fleshy part of the fruit.

3. A method of determining the position of the suture plane of drupaceous fruit comprising the steps of orienting the drupaceous fruit so that the stem to blossom axis is in a predetermined direction, rotatably supporting the fruit about said axis, inserting a plurality of feelers into the fruit along a plane that is substantially at right angles to said axis until the feelers contact the endocarp, determining the location of the suture line of the endocarp from the distance that the feelers extend into the fruit.

4. A method of determining the position of the suture plane of drupaceous fruit comprising the steps of orienting the drupaceous fruit so that the stem to blossom axis is in a predetermined direction, inserting a plurality of feelers into the fruit along a plane that is substantially at right angles to said axis until the feelers contact the endocarp, determining the location of the suture plane of the endocarp from the distance that the feelers extend in to fruit, and rotating the fruit so that said suture plane extends in a certain direction.

5. Apparatus for use in determining the position of the suture plane of drupaceous fruit, comprising means for individually supporting the fruit, a plurality of thin, flat feelers arranged in a plane around the fruit, means for inserting said feelers into the fruit in a medial plane with reference to the stem to blossom axis of the fruit, the inner ends of said feelers engaging the outer surface of the stone of the fruit and means for gauging the distance to which said feelers have penetrated the fruit to determine which of said feelers engages the suture line of said stone.

6. Apparatus for use in determining the position of the suture plane of drupaceous fruit as set forth in claim 5, further characterized in that the means for supporting the fruit includes a rotatable pedestal having a ring of resilient material for receiving the fruit.

7. Apparatus for use in determining the position of the suture plane of drupaceous fruit as set forth in claim 6, further characterized in that there is supported an annular plate on said pedestal, said plate having a plurality of radial holes formed therein for slidably receiving said feelers.

8. Apparatus for use in determining the position of the suture plane of drupaceous fruit as set forth in claim 7, further characterized in that each of said feelers is provided with spring means for urging said feelers inward toward a common center.

9. Apparatus for use in determining the position of the suture plane of drupaceous fruit as set forth in claim 8, further characterized in that there is provided a second annular plate having tooth-shaped projections, said feelers having means for engaging said projections for withdrawing said feelers from the fruit.

10. A method of determining the position of the suture plane of drupaceous fruits, which comprises supporting the fruit in a pre-determined position with reference to its stem-blossom axis, providing an odd number of radially directed elements with respect to a common center, encompassing said fruit while so supported with said elements, extending said elements substantially at right angles to said stem-blossom axis, penetrating the fruit by projecting said elements inwardly of the fruit to contact the stone thereof, whereby one of said elements contacts said stone substantially in said suture plane, and projects a greater distance from the stone and thereby projects beyond the outer ends of the others of said elements.

References Cited in the file of this patent

UNITED STATES PATENTS

| | | |
|---|---|---|
| 1,725,224 | Sturgess | Aug. 20, 1929 |
| 2,744,613 | Hait | May 8, 1956 |